United States Patent
Sala et al.

(10) Patent No.: US 10,550,903 B2
(45) Date of Patent: Feb. 4, 2020

(54) ELECTROMECHANICAL BRAKE CALLIPER ACTUATOR

(71) Applicant: FRENI BREMBO S.p.A., Curno, Bergamo (IT)

(72) Inventors: Paolo Sala, Bergamo (IT); Luca Pagani, Bergamo (IT)

(73) Assignee: FRENI BREMBO S.p.A., Curno, Bergamo (IT)

( * ) Notice: Subject to any disclaimer, the term of this patent is extended or adjusted under 35 U.S.C. 154(b) by 337 days.

(21) Appl. No.: 15/324,444

(22) PCT Filed: Jul. 3, 2015

(86) PCT No.: PCT/IB2015/055019
§ 371 (c)(1),
(2) Date: Jan. 6, 2017

(87) PCT Pub. No.: WO2016/005867
PCT Pub. Date: Jan. 14, 2016

(65) Prior Publication Data
US 2018/0355933 A1    Dec. 13, 2018

(30) Foreign Application Priority Data
Jul. 8, 2014   (IT) .............................. BG2014A0025

(51) Int. Cl.
*F16D 65/56*   (2006.01)
*F16D 65/18*   (2006.01)
(Continued)

(52) U.S. Cl.
CPC ............ *F16D 65/18* (2013.01); *B60T 13/741* (2013.01); *F16D 55/226* (2013.01);
(Continued)

(58) Field of Classification Search
CPC ........ B60T 1/065; B60T 11/04; B60T 11/065; B60T 11/102; B60T 13/74; B60T 13/741;
(Continued)

(56) References Cited

U.S. PATENT DOCUMENTS 3,638,763 A    2/1972   Laverdant
3,688,875 A *  9/1972   De Hoff ................ F16D 65/567
                                                188/196 F
(Continued)

FOREIGN PATENT DOCUMENTS

DE         101 18 871 A1   10/2002
DE      10 2005 030 620 A1  4/2006
WO        2011/118630 A1    9/2011

OTHER PUBLICATIONS

International Search Report and Written Opinion of the International Searching Authority for corresponding International Patent Application No. PCT/IB2015/055019 dated Jan. 14, 2016, 8 pgs.

*Primary Examiner* — Christopher P Schwartz
(74) *Attorney, Agent, or Firm* — Merchant & Gould P.C.

(57) ABSTRACT

An electromechanical brake caliper (9) includes a caliper body (10) and an electromechanical actuator (11). The electromechanical actuator includes a screw (14) and a nut screw (16) coupled to it, so that the nut screw (16) engages a movable thrust element (18, 32) by coupling surfaces (C, C' and $C^{IV}$) that cooperate with each other in the thrust relationship. This configuration allows oscillation of the relative nut screw (16) with respect to the movable thrust element (18, 32) about a single transverse axis (k), impeding the relative rotation between the nut screw (16) and the piston (18) about a longitudinal axis (y) of the thrust element.

8 Claims, 7 Drawing Sheets

(51) Int. Cl.
   *B60T 13/74*   (2006.01)
   *F16D 55/226*  (2006.01)
   *F16D 65/00*   (2006.01)
   *F16D 121/14*      (2012.01)
   *F16D 121/24*      (2012.01)
   *F16D 125/40*      (2012.01)
   *F16D 125/66*      (2012.01)
   *F16D 55/00*       (2006.01)

(52) U.S. Cl.
   CPC .. *F16D 65/0068* (2013.01); *F16D 2055/0016* (2013.01); *F16D 2121/14* (2013.01); *F16D 2121/24* (2013.01); *F16D 2125/40* (2013.01); *F16D 2125/66* (2013.01)

(58) Field of Classification Search
   CPC .... F16D 55/226; F16D 65/0068; F16D 65/14; F16D 65/16; F16D 65/18
   USPC ........... 188/71.9, 72.6–72.8, 196 BA, 196 D
   See application file for complete search history.

(56) References Cited

U.S. PATENT DOCUMENTS

| | | | | |
|---|---|---|---|---|
| 4,083,436 | A * | 4/1978 | Straut | B60T 13/12 188/217 |
| 5,219,047 | A * | 6/1993 | Fouilleux | F16D 65/0979 188/106 F |
| 5,350,042 | A * | 9/1994 | Thiel | F16D 65/567 188/196 D |
| 6,367,592 | B1 * | 4/2002 | Kapaan | F16D 65/18 188/158 |
| 6,554,109 | B1 * | 4/2003 | Olschewski | F15B 7/08 188/162 |
| 7,156,212 | B1 * | 1/2007 | Ciotti | F16D 55/228 188/72.4 |
| 8,607,939 | B2 | 12/2013 | Osterlanger et al. | |
| 2007/0062769 | A1 * | 3/2007 | Noh | B60T 13/588 188/265 |
| 2014/0000992 | A1 * | 1/2014 | Tajima | F16D 65/18 188/72.1 |
| 2014/0158480 | A1 * | 6/2014 | Qian | F16D 55/226 188/72.6 |

\* cited by examiner

ELECTROMECHANICAL BRAKE CALLIPER ACTUATOR

This application is a National Stage Application of PCT/IB2015/055019, filed 3 Jul. 2015, which claims benefit of Serial No. BG2014A000025, filed 8 Jul. 2014 in Italy and which applications are incorporated herein by reference. To the extent appropriate, a claim of priority is made to each of the above disclosed applications.

TECHNICAL SECTOR

This invention pertains, in general, to the field of braking systems; in particular, the invention relates to an actuator for an electromechanical brake calliper.

STATE OF THE ART

The technical field of application of this invention is that of electromechanical brake callipers, which generally require an electrical actuation, a reduction system and a system for converting the motion from rotary to translatory.

The conversion of the motion takes place by means of the meshing between a rotatable screw housed in a caliper body or calliper body, and a nut screw, usually by means of circulating balls in the interface between screw and nut screw, in so-called recirculating ball screws.

The rotation of the screw imparts a translational motion to the nut screw, which pushes a piston that engages one of a pair of brake pads, mounted on the calliper body symmetrically with respect to a brake disc; the pressure of the pads on the disc generates a braking action, whose reaction is discharged onto the calliper body and the elements connected to it. This reaction causes a misalignment between the screw axis and piston axis, compromising the efficiency and/or mechanical integrity of the device due to the uncompensated stresses on the support and transmission components.

In fact, it is known how the flexion of the brake calliper, caused by the reaction force that the brake pads exert on the calliper itself when compressed, causes a relative rotation between the support surface of the piston on the brake pad and the working axis of the screw (with consequent misalignment of the longitudinal axis of the piston with respect to the longitudinal axis of the screw). In other words, the working axis of the screw tends to remain perpendicular to the plane of axial abutment of the screw on the calliper body, while the working axis of the piston tends to remain perpendicular to the pad-disc plane.

This misalignment of the axes can cause a non-uniform distribution of the load on the axial bearing supporting the screw and an imperfect distribution of the load on the rolling elements interposed between screw and nut screw, with consequent inhomogeneous Hertzian pressures on the balls, and thus problems related to the service life fatigue of the components.

To overcome this defect, the stiffness of the calliper body can be increased, thus limiting its deformability. Consequently, the oscillation/inclination of the screw axis, relative to the piston axis, is reduced (i.e., the misalignment between the working axes of the piston and the screw is reduced), with the consequence, however, of significantly increasing the overall dimensions and mass of the brake.

Alternatively, a further degree of freedom can be introduced into the system that allows compensating for the different working angle of the piston-recirculating screw axes. Conveniently, an articulated joint, i.e., a circumferential constraint, is added at the interface between the piston and the nut screw that allows the piston to orient itself in directions not coincident with the longitudinal axis of the screw, while maintaining the possibility for the nut screw to engage and push said piston.

A solution that compensates for misalignment between thrust piston and screw-nut screw assembly, which uses coupling surfaces conical to the interface between nut screw and piston, is known from the document U.S. Pat. No. 8,607,939.

However the known solutions, which typically provide for the application of conical or spherical joints at the interface between the nut screw and the piston, cannot inhibit a possible partial rotation of the piston relatively to the nut screw because it is possible that, at the articulated joint between the nut screw and piston, there will be a mutual sliding between the contact surfaces, giving rise to an angular shift between piston and nut screw.

Such rotation introduces an error in the correlation between the rotation angle of the shaft of the electric motor (angle "a") and the translation of the thrust piston (stroke "c"), where such a correlation must be ensured, in the respect of the design parameters, in all conditions of use (temperature, speed, etc.) to ensure the operational efficiency of the braking device.

In fact, if an anti-rotation system were not present between both the nut screw and the piston and the piston and the calliper body, there would be an imposed rotation of the screw and a rotation of the nut screw and/or piston without any axial displacement with respect to the calliper body. It is therefore necessary that, to an imposed rotation of the screw (correlated to the rotation of the motor by means of the reduction ratio of the mechanical transmission), there is a corresponding axial displacement of the nut screw/piston according to a predetermined relationship, so as to allow the electronic control unit a proper and efficient management of the brake calliper actuation device.

Analysing the kinematic chain associated with an electromechanical calliper, one notes that the interface between the thrust piston and the mechanical system that transforms the motion from rotatory to translatory is the most critical area as regard the adherence (in operating conditions of the braking action) of the real angle-stroke correlation to the design formula.

The implementation of rigid interfaces (for example by threading, interference etc.), useful to ensuring the link "α-c", would result in an over-dimensioning of the mechanical parts due to the stresses resulting from the inability of the components themselves to compensate for the deformations of the brake calliper under load.

However, the prior art does not offer solutions advantageous for avoiding the phase shift between the nominal link "α-c" and link "α-c" under operating conditions (i.e., when the calliper exerts a braking action on the disc), exploiting for example only the coupling surfaces between piston and nut screw.

It is therefore necessary to create shape couplings or add specific devices that ensure the link "α-c".

SUMMARY OF THE INVENTION

A purpose of this invention is to simultaneously ensure the compensation of the misalignment and the nominal correlation "α-c".

To achieve this result, on the piston and nut screw arcuate coupling surfaces are formed, having profiles at least partly complementary, such as to allow a mutual rotation of these components according to an axis of rotation perpendicular to the plane of preferential deformation of the calliper body, when this is stressed by the axial thrust force, at the same time inhibiting the possibility for the piston to slide, with respect to the nut screw, according to a circumferential direction.

Conveniently a contrast pin, integral with the calliper body, engages the piston in such a way that it cannot rotate about its longitudinal axis not even with respect to said calliper body.

This configuration, while allowing the compensation of the misalignment between the longitudinal axes of nut screw and piston, inhibits the mutual rotation between the piston and nut screw, as well as between piston and calliper body, while preserving the design correlation "α-c".

In this way, efficiency of the actuator formed by the screw-nut screw-piston assembly is maximized.

BRIEF DESCRIPTION OF THE DRAWINGS

We will now describe the structural and functional characteristics of several preferred embodiments of a mechanical actuator according to the invention. Reference is made to the accompanying drawings, in which.

DETAILED DESCRIPTION OF THE INVENTION

Figure 1:
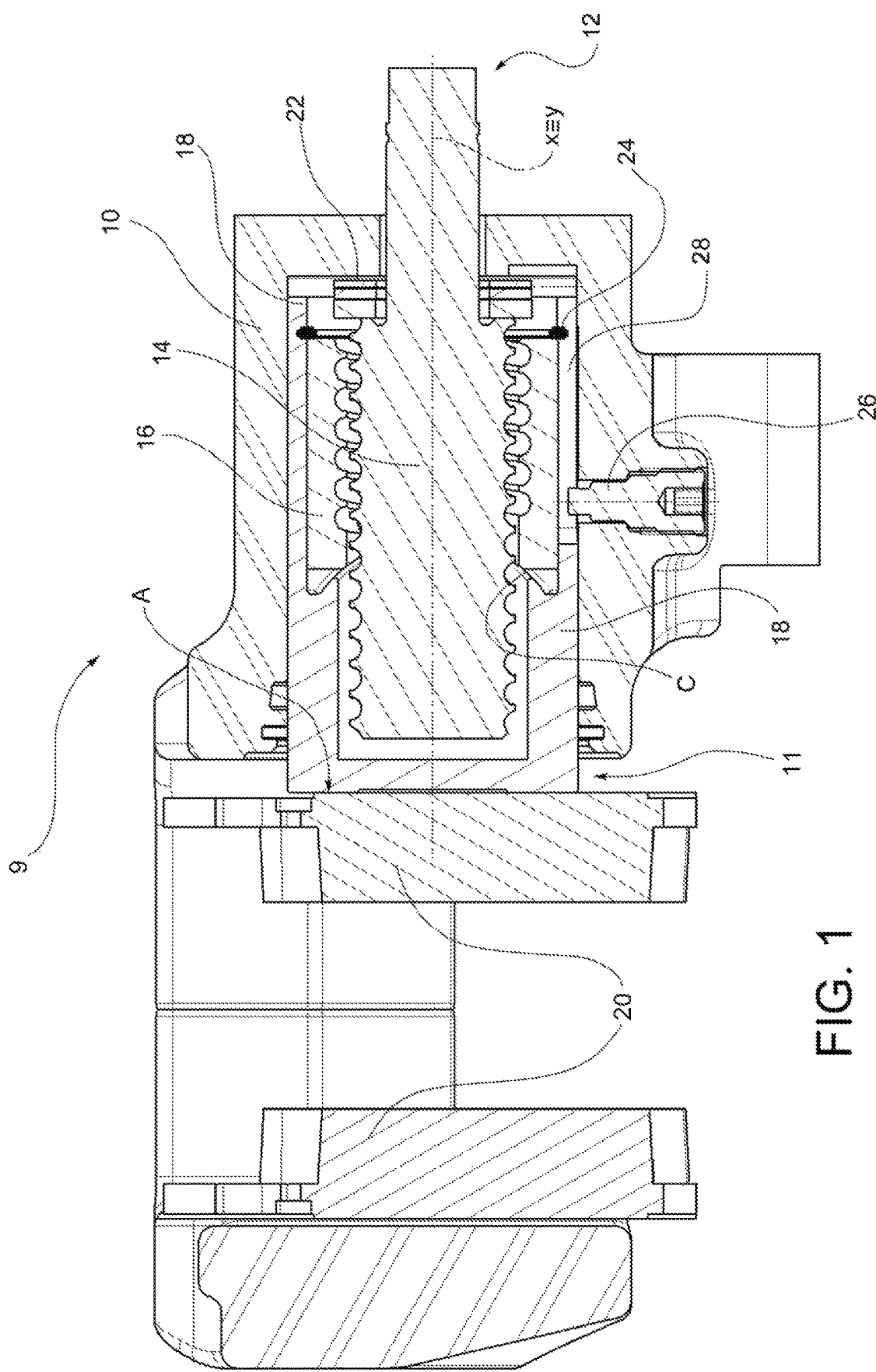
FIG. 1 is a schematic side sectional view of an electro-mechanical brake calliper, comprising an actuator according to an embodiment of the invention.

Before explaining in detail a plurality of embodiments of the invention, it should be clarified that the application of the invention is not limited to its construction details and the configuration of the components presented in the following description or illustrated in the drawings. The invention is able to assume other embodiments and to be practically implemented or realized in different ways.

Referring initially to FIG. 1, an electromechanical brake calliper 9 comprises a calliper body 10 inside which is housed a mechanical actuator 11 that includes, according to a preferred embodiment of the invention, a recirculating ball screw 12 and a movable thrust element 18,32. The recirculating ball screw 12 comprises a screw 14, rotatable about a first longitudinal axis x, which screw is associated in rotation to a nut screw 16 which, in function of the rotation of the screw 14, can move with a reciprocating motion along a direction parallel to said first longitudinal axis x.

The nut screw 16 engages the movable thrust element 18,32 that, pushed by the axial translation of the nut screw, generates a thrust on one of a pair of pads 20, which in turn imparts a braking action on a brake disc (not shown).

According to an embodiment of this invention, the movable thrust element is a cylindrical piston 18, hollow on the inside, that directly engages the pad 20 and pushes it against the brake disc.

Conveniently, the screw 14 is supported by an axial bearing 22, and, in the inner jacket of the piston 18 is formed an annular groove 24a (visible in FIG. 4) to receive a Seeger type ring 24.

Figure 2:
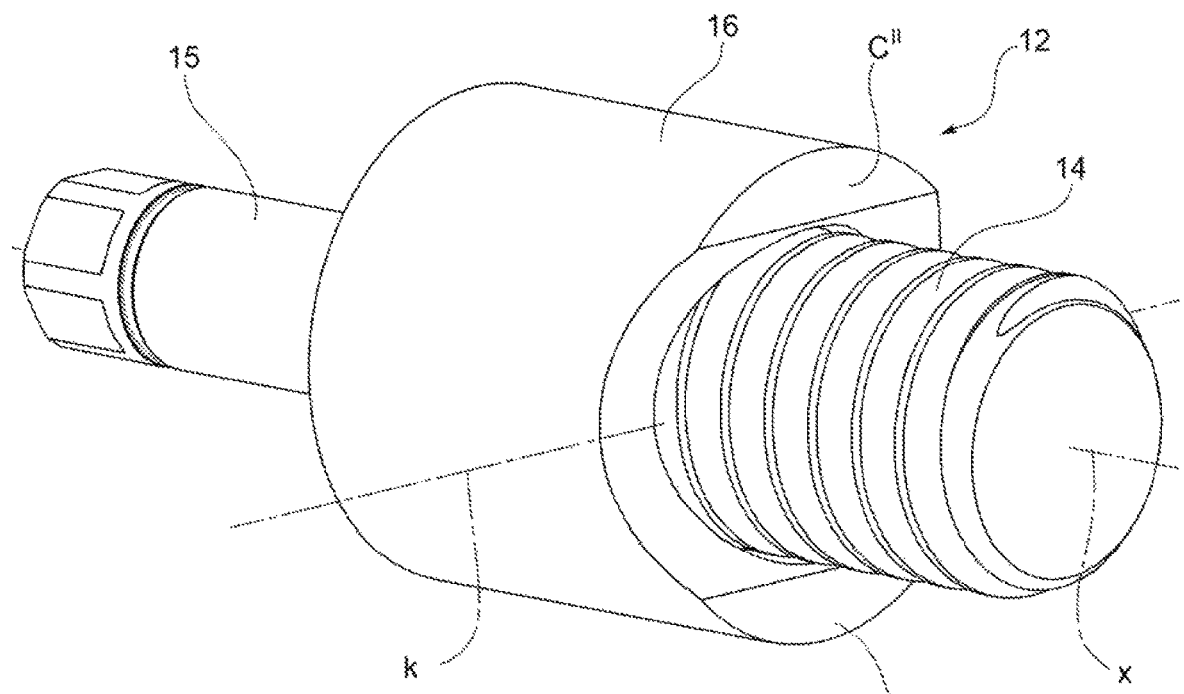
FIG. 2 is a schematic axonometric view of a screw-nut screw assembly, included in the actuator of FIG. 1.
Figure 3:
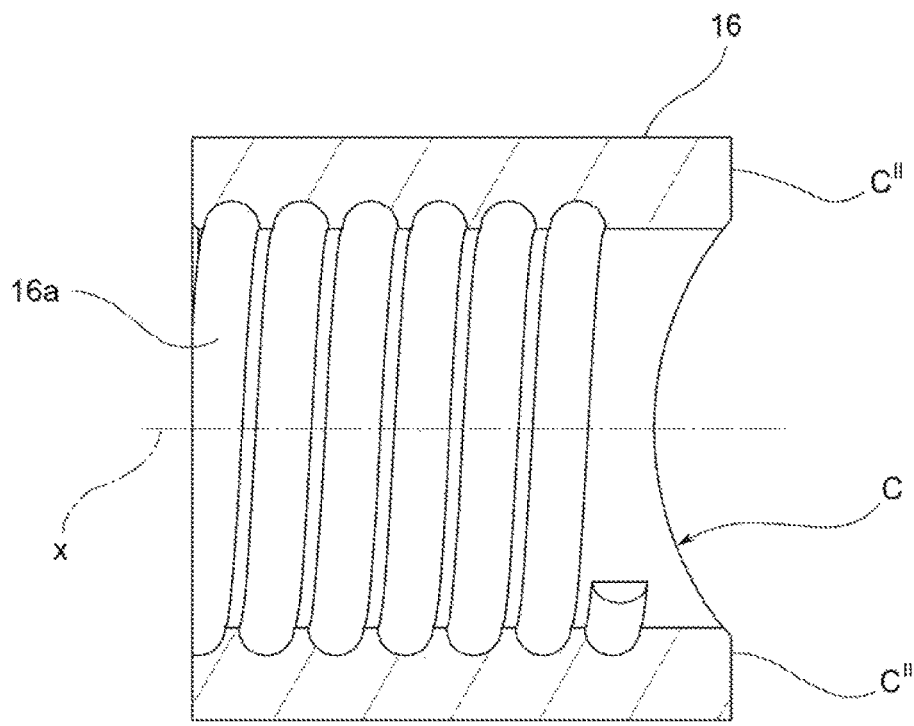
FIG. 3 is a schematic side sectional view of a nut screw, included in the assembly of FIG. 2.

FIG. 2 shows in more detail a recirculating ball type screw, according to an embodiment of this invention. From said figure it is clear that the screw 14 and the nut screw 16 are coaxial with respect to the first longitudinal axis x, in such a way that, to a rotation of the screw 14, there is a corresponding translation of the nut screw 16, of a stroke linked to the angular excursion of the screw. On a transverse face of the nut screw 16, proximal to the area of contact with the piston 18, are formed first coupling surfaces C, in the example illustrated here having a concavity facing the opposite face of the nut screw 16. FIG. 3 shows how said first coupling surfaces C are formed in a region radially peripheral of the nut screw 16, in the form of a flat and inflected pseudo-torus, possibly surmounted by two planar segments C", corresponding to the remaining part of the transverse face of the nut screw 16, which acts as a contact interface with the piston 18.

Throughout this description and in the claims, terms and expressions indicating positions and orientations, such as "longitudinal", "transverse", etc., refer to the first longitudinal axis x.

Figure 4:
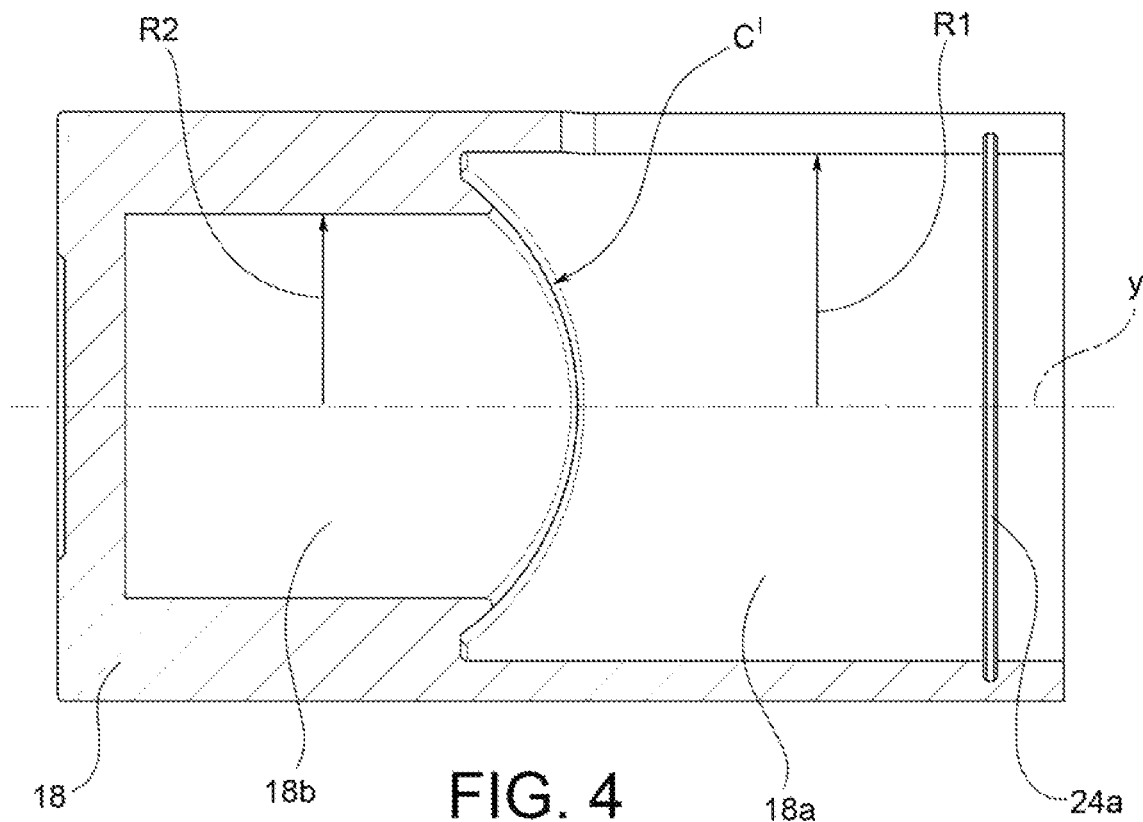
FIG. 4 is a schematic side sectional view of a thrust piston, included in the actuator of FIG. 1, according to an embodiment of the invention.
Figure 5:
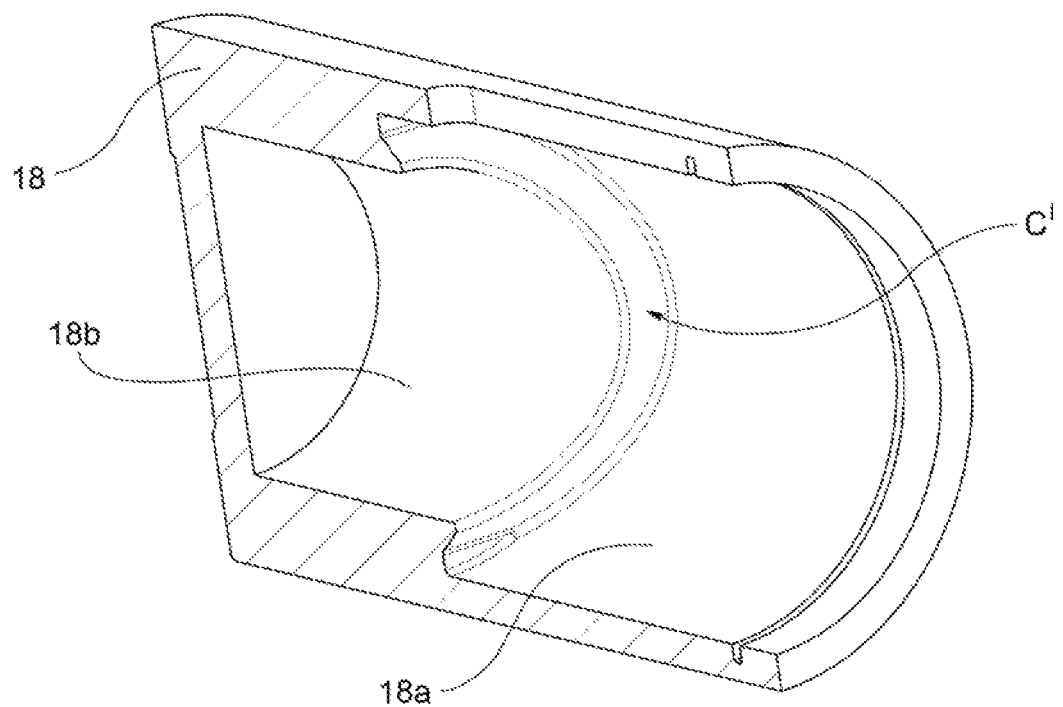
FIG. 5 is a schematic axonometric sectional view of the piston of FIG. 4.

As can be seen in FIG. 4, the piston 18 has two inner cylindrical cavities 18a, 18b, extending axially along a second longitudinal axis y of the piston 18; the first cylindrical cavity 18a, proximal with respect to the axial bearing 22, is configured so as to concentrically house the recirculating ball screw 12, and in particular the nut screw 16. The second axial cavity 18b houses the portion of the screw that extends longitudinally beyond the nut screw 16.

The piston 18 is internally shaped so as to present a second coupling surface C', on which engages the corresponding first coupling surface C, formed on the radially outer crown of the nut screw 16. The two coupling surfaces C, C', when they come in contact during the axial stroke of the nut screw 16, cooperate in a thrust relationship to impart a translatory movement axial to the piston 18, which goes to push the pad 20 by pressing on a transverse thrusting plane A.

Figure 6:
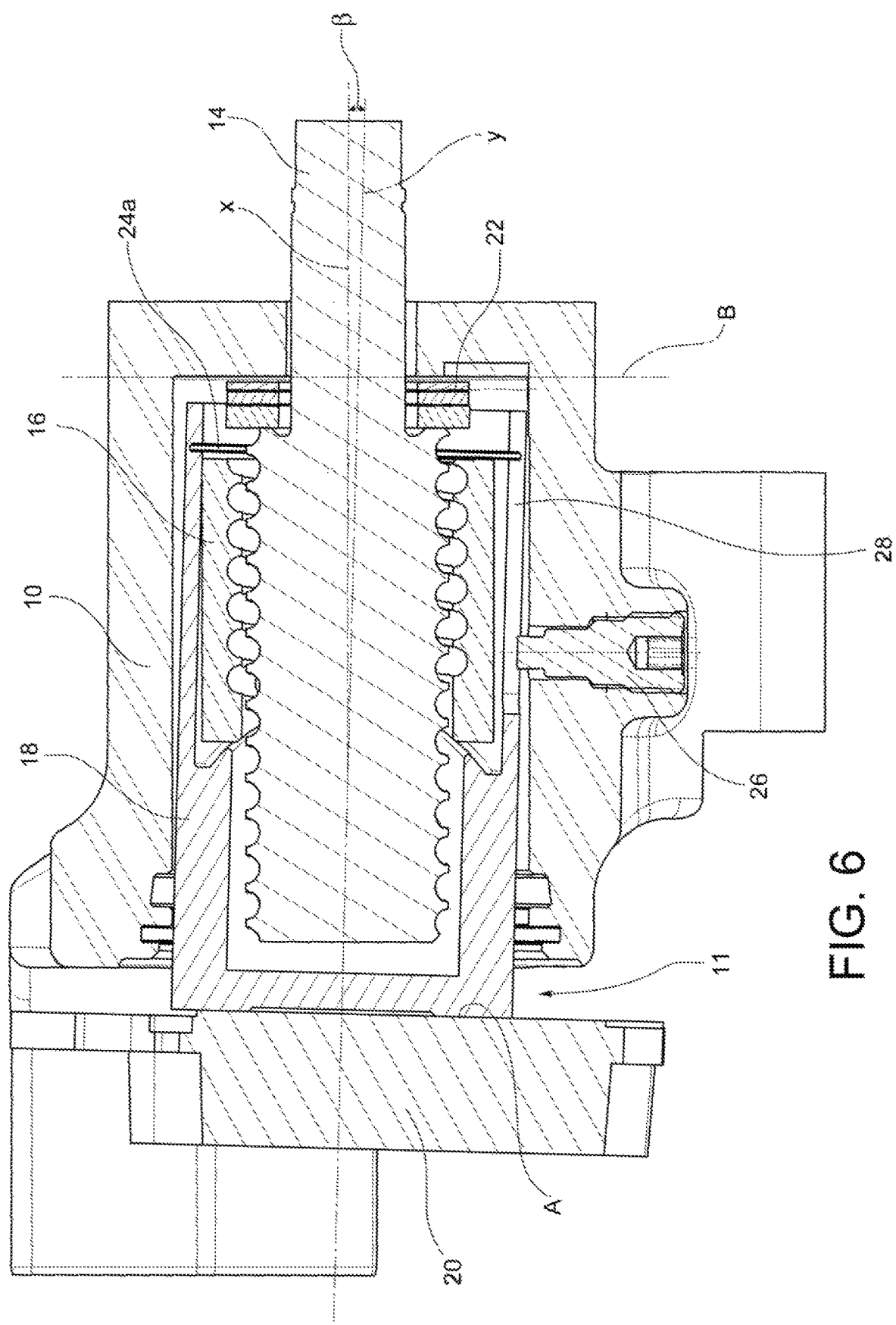
FIG. 6 is a schematic side sectional view of an electro-mechanical brake calliper, comprising an actuator according to an embodiment of the invention, in an operating condition of the braking action.

According to a preferred embodiment of the invention, the axial cavities 18a, 18b, internal to the piston have different radii R1, R2, the difference between said radii identifying an annular projection of the second coupling surface C' on a plane normal to the second longitudinal axis y. The condition of difference in the thickness of the piston, linked to the difference of the radii R1, R2 of the axial cavities 18b, 18b, it is preferred but not limiting, since it is possible for example that the piston has two internal cavities with the same radius, to whose interface is interposed an annular septum having a radial thickness and axial extension equal to the thickness and extension of the second contact surface C'. As shown in FIGS. 1 and 6, the nut screw engages and pushes the piston through the coupling and contact between said first and second coupling surface C, C' respectively associated to the nut screw 16 and the piston 18.

As previously mentioned, the stress to which the calliper 9 and, in particular, the calliper body 10, is subjected due to the reaction that the brake disc exerts with respect to the braking action of the brake pad 20, actuated by the piston 18, causes a deformation of the calliper body itself, predominantly a flexural deformation in a diametrical plane of the piston (substantially, the plane in which are contained FIGS. 1 and 6). The divarication of the calliper body 10 involves a rotation of a transverse reaction plane B of the calliper body 10 about an axis substantially perpendicular to the second longitudinal axis y of the piston 18. Such rotation of the reaction plane B generates a similar upward rotation of the screw 14, consequently generating a misalignment according to an angle β (as can be seen in FIG. 6), between the first longitudinal axis x of the recirculating ball screw and the second longitudinal axis y of the piston.

The coupling surfaces C,C' allow mutual misalignment between the nut screw 16 and the piston 18, along the plane of preferential deformation of the calliper body 10, but prevent mutual rotation, about the second longitudinal axis y, of the piston with respect to the nut screw 16. In this way, the piston 18 can oscillate about a predetermined transverse axis k, substantially perpendicular to the first longitudinal axis x, but is not rotatable about its second longitudinal axis y. According to an embodiment of the invention, a further rotation of the piston around its own longitudinal axis y, with respect to the calliper body 10, is prevented by contrast means to the rotation 26,28, i.e., a contrast element (for example a pin, or a spline, in a manner not shown), conveniently inserted in the calliper body according to an axis normal to the longitudinal axis x, able to engage a recess or axially elongated slot 28, formed in the outer thickness of the piston 18. The slot may or may not be passing through the radial thickness of the piston.

The pin 26 protrudes with one end into the slot 28, blocking the rotation of the piston 18 when said piston is in a state of incipient rotation about its longitudinal axis y; therefore, the axial slot, inside which protrudes the end of the pin 26, will go in abutment against this end of said pin, thereby impeding the rotation of the piston around its own longitudinal axis. The conformation of said contrast means 26,28 can be reversed, so that the recess can be made in the calliper body 10 and the contrast element be integral with the piston 18.

Figure 7:
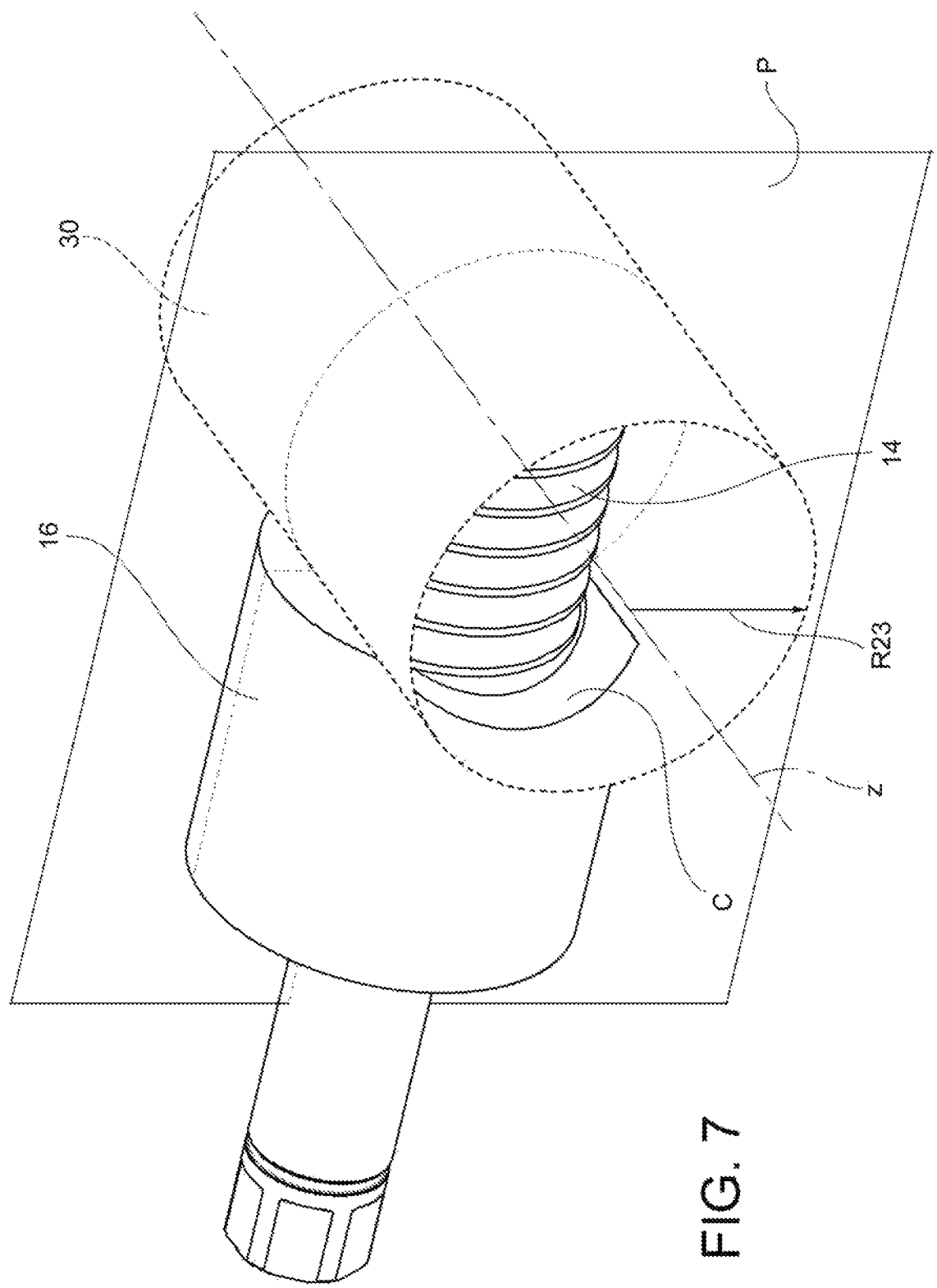
FIGS. 7 and 8 are two schematic perspective views of a virtual cylinder that intersects a screw-nut screw assembly, so as to define a coupling surface on the nut screw, according to an embodiment of the invention.
Figure 8:
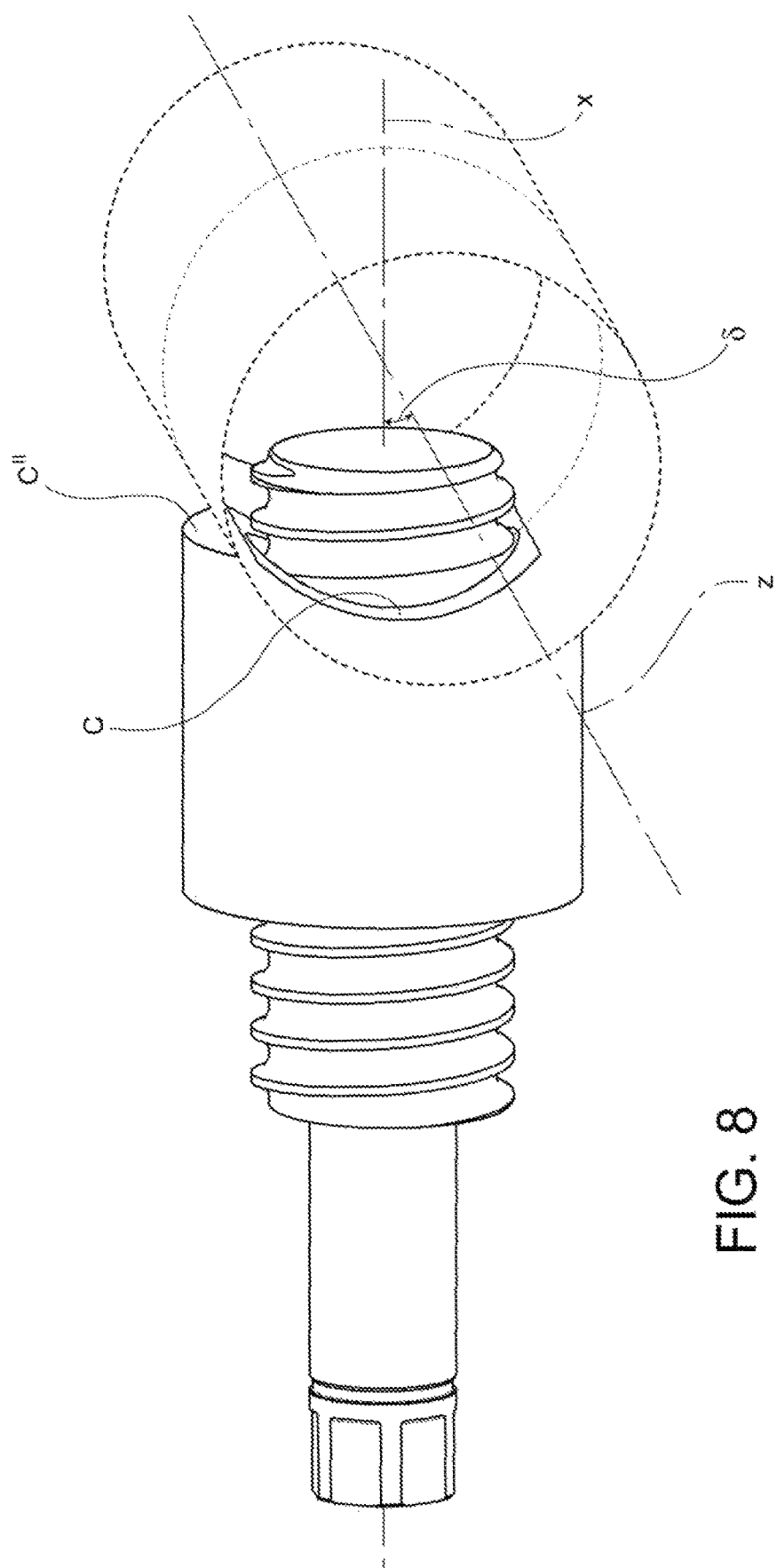

FIGS. 7 and 8 show how the coupling surfaces can be defined starting from the intersection of the nut screw 16 or, in a manner not shown, of the piston 18, with a virtual solid 30, for example with a cylinder having a virtual axis z, oriented according to an virtual angle δ (visible in FIG. 8) with respect to the first longitudinal axis x of the screw 16. Preferably, the virtual angle δ is a right angle.

The cylinder has, according to an embodiment of the invention, a circular section having a radius R3, but it may have any closed or open section (for example elliptical, parabolic, hyperbolic, polygonal etc.), provided that this section ensures the relative anti-rotation between the nut screw and the piston with respect to the y axis, but allows the relative rotation between the piston-screw axes with respect to an axis perpendicular to the plane of maximum deformation of the calliper body.

Other geometric shapes of the virtual solid 30 are not excluded (for example, the toroidal shape), in which case the virtual axis z can also vary with respect to the linear shape (for example, the axis of the toroid is circular, but functionally it could be elliptical, parabolic, etc.).

In one embodiment, the first coupling surfaces C are definable as the portion of the outer surface of the virtual cylinder 30 that intersects the nut screw 16. By varying the section of the virtual cylinder 30, and/or the position (in radial and/or longitudinal direction) and the orientation δ of said axis with respect to the nut screw 16, it is possible to vary the concavity, shape and extension of said first contact surfaces C. For example, in a manner not illustrated, it is possible to obtain a first coupling surface C that includes a pair of curved recesses having different radii of curvature, by varying the angle δ of intersection between the virtual cylinder 30 and the nut screw 16; in a preferred embodiment, in which the virtual angle δ is 90°, the first coupling surface is specular with respect to a diametral plane P (shown in FIG. 7), passing through the longitudinal axis x and substantially coinciding with the plane of FIG. 1. In the case in which the angle δ is not perpendicular to the plane of greatest deformation of the calliper body, the compensation effect of said deformation would decrease, becoming zero when δ was equal to 0° (i.e., if there was not an articulated joint, but a rigid constraint with respect to the plane of maximum deformation).

It is understood that the same reasoning can be made with respect to the piston 18, if we consider for example the portion of intersection between the side surface of the virtual cylinder 30 and at least part of the radial thickness of the piston 18.

Figure 9:
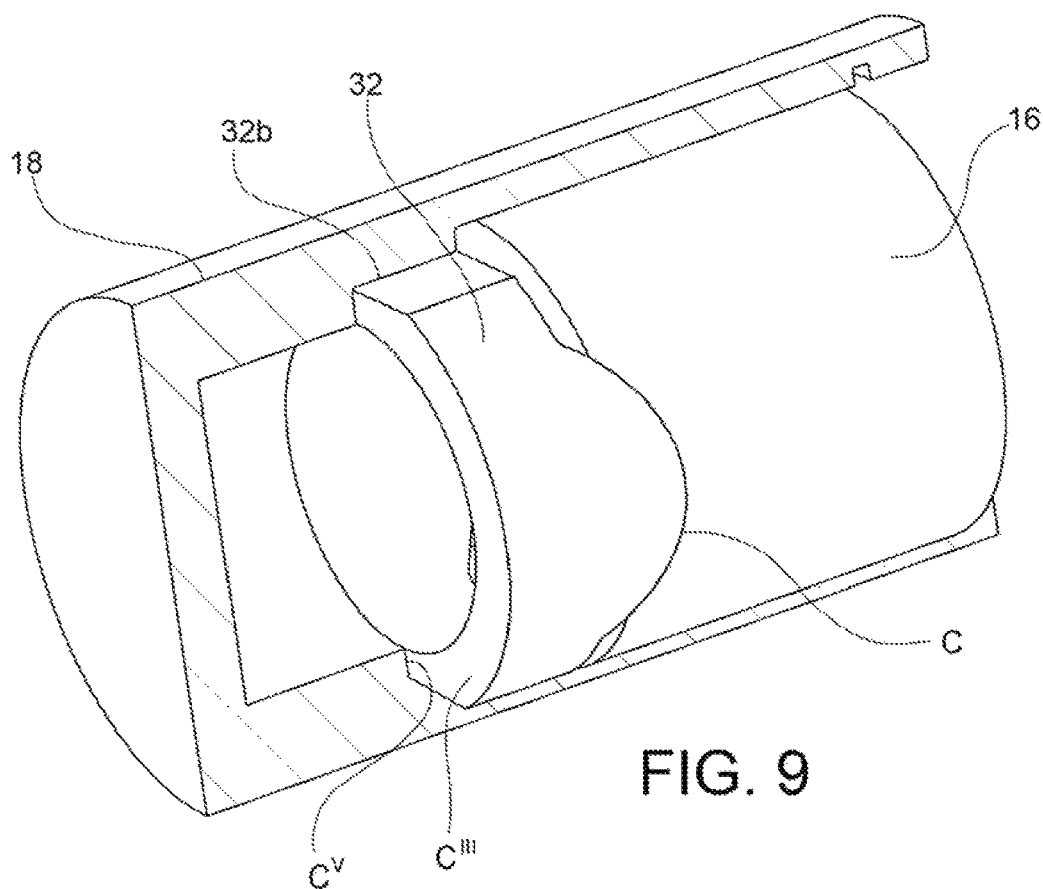
FIG. 9 is a schematic axonometric sectional view of a piston-nut screw assembly, comprising an additional adapter according to an alternate embodiment of the invention.

Moreover, FIG. 9 illustrates an alternative embodiment of this invention, particularly suitable in the case in which the piston is produced by machining with machine tools, rather than by moulding (for example, in the case of small production volumes). In this case, the movable thrust element 18,32 is an insert 32 interposed at the interface between nut screw 16 and piston 18, said insert 32 including annular radial profiles $C'''$, $C^{IV}$ respectively congruent with an annular housing seat $C^V$, formed in the inner thickness of the piston, and a transverse interface of the nut screw 16, on which are formed the first coupling surfaces C.

Figure 10:
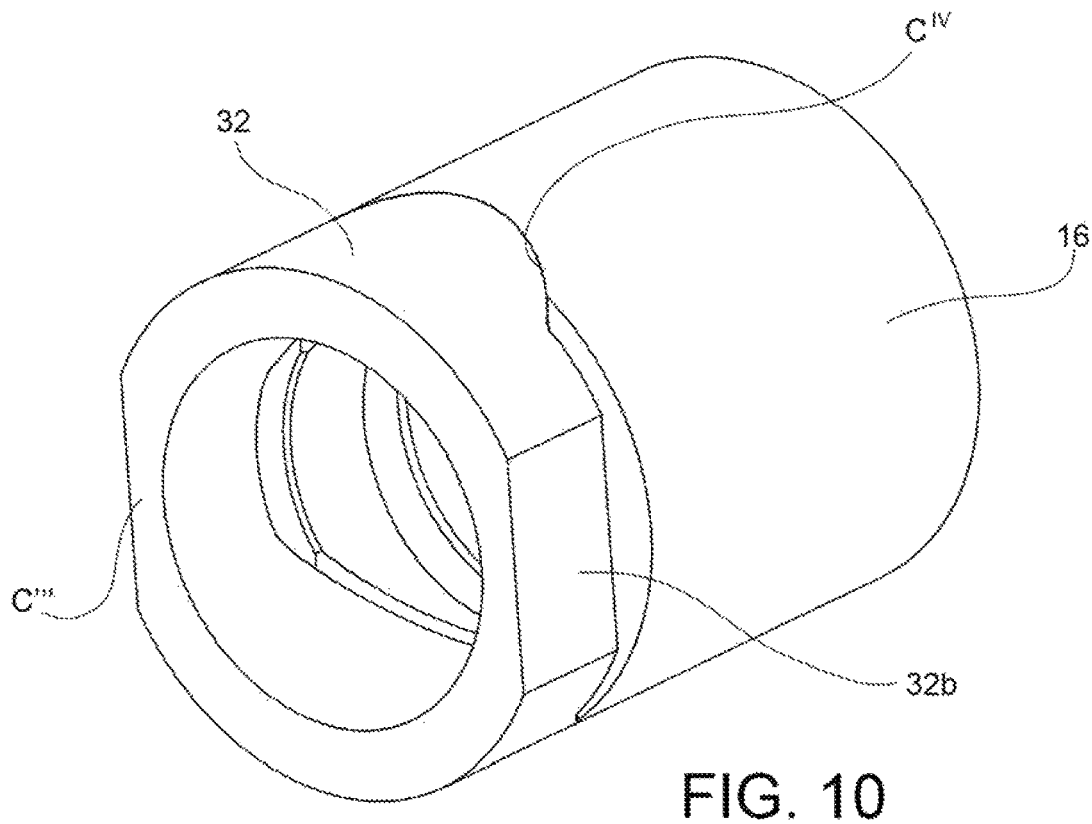
FIG. 10 is a schematic axonometric view of the nut screw-adapter assembly of FIG. 9.

FIG. 10 illustrates, in particular, the coupling between the insert 32 and the nut screw 16, where the insert 32 has curvilinear profiles $C^{IV}$ that engage the corresponding coupling surfaces C formed in the thickness of the nut screw 16. For the coupling between the complementary surfaces of nut screw and insert the same considerations expressed are valid for the coupling between the piston and the nut screw.

According to an embodiment of the invention, one or more flat portions 32b (preferably a pair, as shown in this example) allow rotationally solidifying the insert 32 to the piston 18, abutting against suitable seats formed in the inner thickness of the piston 18. According to an alternative not shown, the anti-rotation function between the insert 32 and the piston 18 can be effected with a generic shape coupling or any other type of coupling that can inhibit the relative rotation (screwing, welding, gluing etc.).

Both in the case of a direct coupling between piston and nut screw and in the case of a coupling mediated by the insert 32, it is not necessary that the coupling surfaces C, C' and $C^{IV}$ be perfectly superposable, since it is sufficient that at least part of the two surfaces is mutually congruent and/or tangential and in reciprocal contact. In the case of congruent profiles (and, consequently, coaxial, as in the case illustrated here), the predetermined transverse axis of rotation k will coincide with the common axis of the profiles. Conversely, if the coupling surfaces (C, $C'''$ and $C^{IV}$) were mutually tangent but with different radii of curvature, the predetermined transverse axis k of rotation between the nut screw 16 and the thrust element 18,32 would coincide with the axis of tangency of the profiles of said coupling surfaces.

Moreover, it is possible to place the concave profile on the nut screw, and the associated convex profile on the piston, or vice versa (the same applies to the coupling between the insert 32 and the nut screw 16).

In conclusion, the embodiments described here allow compensating the misalignment β between the piston and the recirculating ball screw, at the same time preventing the reciprocal rotation between the piston 18, nut screw 16 and calliper body 10, thus preserving the predetermined correlation between the stroke of the piston and the rotation of the screw. We have described various aspects and embodiments of an actuator for an electromechanical calliper according to the invention. It is understood that each embodiment may be combined with any other embodiment. Moreover, the invention is not limited to the embodiments described but may be varied within the scope defined by the appended claims.

The invention claimed is:

1. An electromechanical brake caliper comprising a caliper body and an electromechanical actuator including:
    a screw rotatable about a longitudinal axis;
    a nut screw rotationally coupled to said screw, the nut screw being movable along a direction parallel to the longitudinal axis of the screw;
    a movable thrust element, comprising a thrust element longitudinal axis and axially juxtaposed to the nut screw, said nut screw engaging said movable thrust element;
    a coupling interface between the nut screw and the movable thrust element, comprising at least a first coupling surface in the nut screw, and at least a second coupling surface in the movable thrust element, said second surface being at least in part coupled to the first surface and cooperating in a thrust relation with said first surface;
    wherein one of said coupling surfaces is concave and the other of said surfaces is convex, and engages the concave coupling surface, said surfaces being arranged to allow relative oscillation of the nut screw with respect to the movable thrust element about a single predetermined axis substantially transverse to the longitudinal axis of the screw;
    wherein the first and the second coupling surfaces are portions of coaxial cylindrical surfaces complementary to one another, the nut screw and the movable thrust element being shaped to allow relative oscillation thereof about an axis common to said first and second coupling surfaces; and
    wherein relative rotation about the thrust element longitudinal axis between the nut screw and the movable thrust element is hindered.

2. A brake caliper according to claim 1, wherein:
    each of the coaxial cylindrical surfaces comprises a virtual axis, inclined by an angle with respect to the longitudinal axis of the screw or to the thrust element longitudinal axis; and
    each of the coaxial cylindrical surfaces intersects at least in part the nut screw or the movable thrust element.

3. A brake caliper according to claim 2, wherein the angle is a 90° angle.

4. A brake caliper according to claim 1, wherein the thrust element comprises a piston and an insert coaxial and mutually coupled by annular radial profiles.

5. A brake caliper according to claim 4, wherein the insert comprises at least one levelling, which engages a further profile of the piston, adapted to hinder relative rotation of the insert with respect to the piston about the thrust element longitudinal axis.

6. A brake caliper according to claim 1, wherein between the movable thrust element and the caliper body there are provided contrast means adapted to hinder relative rotation thereof about the thrust element longitudinal axis.

7. A brake caliper according to claim 6, wherein said contrast means comprise:
    an axially elongated recess in the thrust element; and
    a rotation contrast element, integral to the caliper body, which projects at least partially in said recess.

8. A brake caliper according to claim 1, wherein the first and the second coupling surfaces include respective profiles mutually tangent substantially along said single predetermined transverse axis and longitudinally spaced apart starting from a region of tangency between the first and second coupling surfaces.

* * * * *